Patented Jan. 4, 1927.

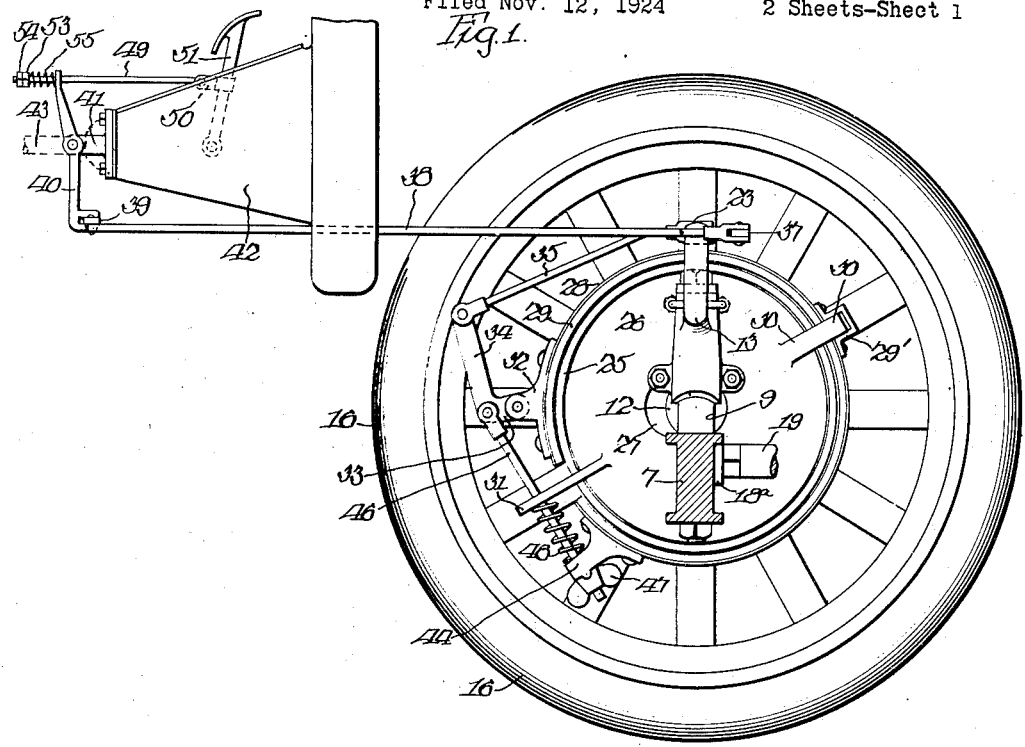

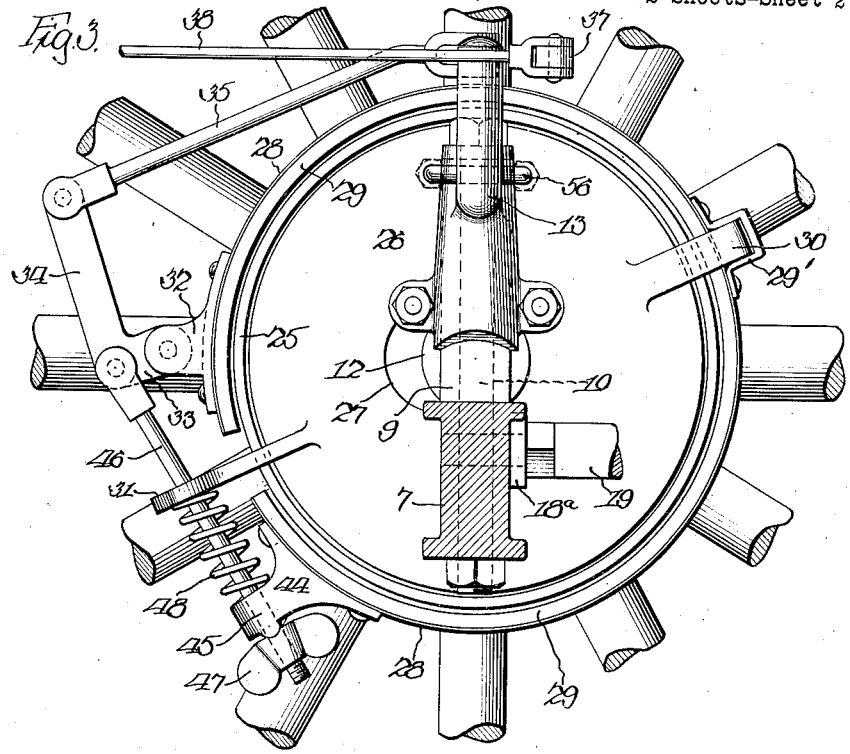
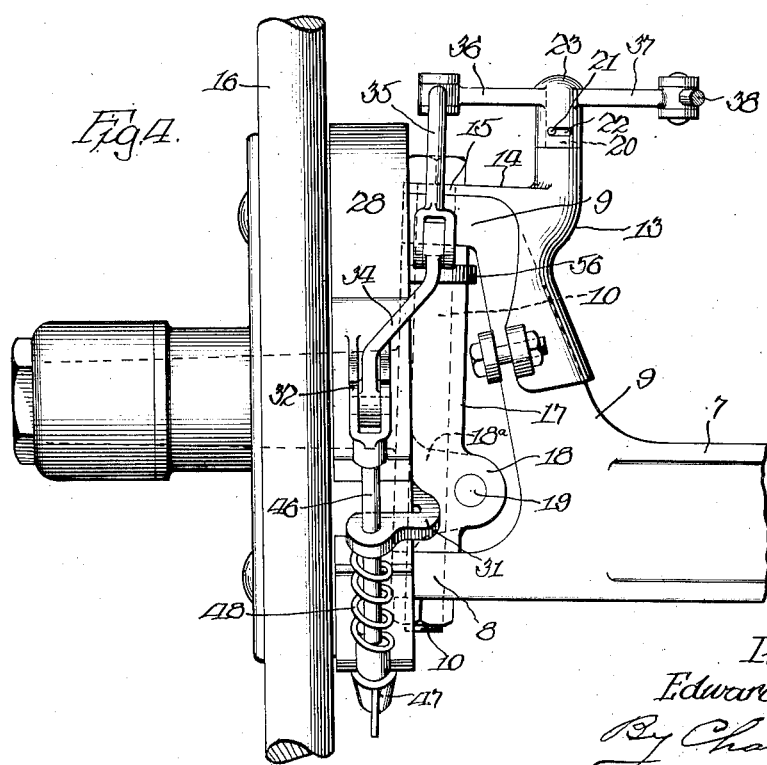

1,613,589

UNITED STATES PATENT OFFICE.

EDWARD L. KULICK, OF CHICAGO, ILLINOIS, ASSIGNOR OF ONE-HALF TO ZIGMUND SHUGER.

BRAKE MECHANISM FOR AUTOMOBILES.

Application filed November 12, 1924. Serial No. 749,422.

This invention relates, generally, to brakes and particularly to a brake mechanism for automobiles of a type employing a planetary system of power transmission including therein a brake mechanism, with which my improvements are associated and co-operate to accomplish certain beneficial results as will be hereinafter disclosed.

As the Ford type of automobiles employs power transmitting means of the above mentioned character, I have, while not restricting the invention thereto in its application or use, except where so specified in the annexed claim, shown, and will hereinafter describe the invention as embodied in an automobile of the Ford type sufficient parts thereof only being illustrated in the drawings and referred to in the following description and explanation to furnish a clear and full understanding thereof.

The invention consists in certain peculiarities of the construction, novel arrangement and co-operation of the various parts thereof, as well as, the novel association with certain well known and commonly used elements of an automobile employing the type of power transmitting means above mentioned.

The invention has for one of its objects the provision of a brake mechanism incorporated in the structure of an automobile having a planetary system of power transmission including therein braking means, so associated with said transmission means and the front wheels of the vehicle, as to furnish what may be termed, a three-point brake, whereby the quivering or vibratory effect and the consequent chattering noise incident to the application of the brake mechanism in the said transmission means, commonly called "the service brake" of a Ford automobile, will be eliminated, or reduced to a minimum.

Another object is the provision of means in a structure of the above named kind, whereby the brake bands or elements thereof for the front wheels of the vehicle will be applied with yielding pressure, thus obviating abrupt or too sudden stopping of the vehicle and thus preventing its tendency to rise at its rear portion from the ground when stopped.

Other objects and advantages of the invention will become apparent from the following explanation and description, which will be more readily understood when read in conjunction with the accompanying drawings, in which an embodiment of the invention is illustrated, it being understood that changes and modifications may be resorted to without a departure from the spirit of the invention, so long as they fall within the scope of the appended claim forming a part hereof.

In the drawings,—

Figure 1 is an inner face view of one of the front wheels of an automobile showing the front axle thereof in cross-section and illustrating said wheel equipped with a mechanism embodying my improvements connected to the foot lever of the brake mechanism of a planetary power transmitting apparatus, the said view being taken on line 1—1 of Fig. 2 looking in the direction indicated by the arrows.

Fig. 2 is a plan view of like parts but showing in addition thereto a fragment of the other front wheel of the vehicle.

Fig. 3 is a greatly enlarged inner face view of a fragment of the front wheel shown in Fig. 1 equipped with a brake mechanism constructed according to my invention, and Fig. 4 is a rear view in elevation thereof.

Corresponding numerals of reference refer to like parts throughout the different views of the drawings.

The reference numeral 7 designates the front axle of the vehicle, which axle is shown as being of the Ford type and has at each of its ends an outward extension 8 and an upwardly and outwardly disposed extension or arm 9 in the outer portion of each pair of which is a pivot pin 10 for the pivotal support of one of the spindles 12, mounted in the ordinary way. Each of the upwardly and outwardly extended arms 9 has mounted on its upper inner portion a bracket designated as a whole by the numeral 13 each of which is provided with a horizontally extended arm 14 having an aperture 15 for the reception of one of the pivot pins 10 the head of which pin rests on the upper surface of the arm 14, as is clearly shown in Fig. 4 of the drawings. As usual, each of the spindles 12 for the front wheels 16 of a Ford automobile is provided at its inner end with a hollow upright body 17 located between the upper end of the arm 9 and the upper surface of the extension 8 at each end of the front axle, for co-operation with the pivot pins 10 so as to permit of pivotal movement of the front wheels with respect to said axle in steering the vehicle. At least one of these bodies 17 is provided near its lower end with an apertured lug 18 to register with a similar lug 18ᵃ on the dust plate 26, through which openings the speedometer connection 19 is extended and threaded therein at one of its ends in a well known way.

Each of the brackets 13 has at its upper end a reduced portion or stem 20 provided with a lateral projection or pin 21 to co-operate with a slot 22 in a cap or hub like portion 23 of a lever which is somewhat of the bell crank type and is designated as a whole by the numeral 24, one of which levers and its hub or cap is pivotally mounted on each of the stems 20 with the pin 21 in its slot so as to restrict the rotary movement of the cap on its pivot. Each of the front wheels 16 is provided on its inner surface concentrically with respect to the spindle 12 on which the wheel is mounted, with a brake drum 25 preferably in the form of an annulus as is clearly shown in Figs. 1 and 3 of the drawings. Fitted in this drum 25 is a dust plate 26 which is provided with an elongated opening 27 to permit of the easy insertion of the spindle 12 of the wheel and for the ready adjustment of the said plate with respect to the drum and other elements of the mechanism.

Mounted on the outer periphery of the drum 25 is a broken brake band 28 which is provided with a suitable lining 29 interposed between it and said band for well known purposes. This band has at a point about diametrically opposite its approximated ends a loop or bracket 29' fixed thereto for engagement with a radially disposed arm 30 on the dust plate 26, which plate has at a point about diametrically opposite the arm 30 another radially disposed arm 31 which is provided with an opening near its free end for the purpose to be presently explained.

The brake band 28 is provided near one of its ends with an outwardly extended bracket 32 to which is pivotally connected the shorter arm 33 of a bell crank lever the other or longer arm 34 of which is by preference offset as shown in Figs. 2 and 4 of the drawings and is pivotally connected near its end opposite the arm 33 to one end of a rod 35 the other end of which is pivotally connected to an arm 36 of the lever 24 so that the connection uniting the rod 35 and arm 36 will normally be positioned directly over the head of one of the pivot pins 10 for one of the spindle bodies 17 for one of the front wheels, it being understood that the mechanism for each front wheel is identical and therefore only one of said mechanisms need be described.

Pivotally connected to the arm 37 of the lever 24, which arm is normally extended forwardly and inwardly from its bearing or hub 23, is one end of a connecting rod 38, which extends rearwardly as is clearly shown in Fig. 2 of the drawings, in which view it will be seen that each of the rods 38 is pivotally connected at its rear end to the equalizer or equalizing bar 39, which bar is pivotally mounted at its middle on the lower portion of an upright lever 40 fulcrumed to a bracket 41 extended rearwardly from the transmission casing 42, which casing is supported in a well known way on the frame of the vehicle and has extended therefrom the driving shaft 43 which is operatively connected for driving purposes to the automobile in a well known way or any preferred manner.

Referring now to Fig. 3 of the drawings, it will be seen and understood that the brake band 28 has mounted thereon near its end adjacent the arm 31 of the dust plate but on the opposite side of said arm from that end of the band which carries the bracket 32, another bracket 44 which has an opening 45 therethrough for the reception of a rod 46 which is pivotally connected at one of its ends to the juncture of the arms 33 and 34 of the bell crank lever connected to the bracket 32 as above described. This rod 46 is extended through the opening in the arm 31 as well as through the opening 45 in the bracket 44 and has mounted on its portion adjacent the last named bracket a nut 47 to be used for regulating the tension of a spring 48 which is coiled around the rod 46 and interposed between the arm 31 and the bracket 44 and employed for normally holding the brake band and its lining out of contact with the brake drum.

As is clearly shown in Figs. 1 and 2, the lever 40 which carries the equalizer 39 is vertically mounted and fulcrumed on the bracket 41 and has in its upper end an opening through which a rod 49 is slidably and horizontally extended above and slightly to one side of the transmission casing. One end of the rod 49 is pivotally connected to an arm or a pair of links 50 secured at one of their ends to the foot lever 51 used for applying the service brake or the brake mechanism of the planetary power transmission located within the casing 42, which lever is fixed at its lower end to a shaft 52 extended through one side of the said casing and operatively connected within the casing to the said brake mechanism. Mounted on the free end of the rod 49 is an adjusting nut 53 and a lock nut 54 therefor which are employed to regulate the tension of a spring 55 mounted around the rod 49 and interposed between the nut 53 and the upper end of the lever 40 as is clearly shown in Figs. 1 and 2 of the drawings.

From the foregoing and by reference to the drawings, it will be readily understood and clearly seen that, assuming it is desired to check, retard, or stop the movement of the vehicle, it is only necessary to apply foot pressure to the foot lever 51 of the service brake, in which operation it is obvious that said lever will be moved forwardly or towards the front axle, thus causing, through the instrumentality of the connecting rod 49 and the spring 55 thereon, the upper portion of the lever 40 to be moved forwardly and its rear portion rearwardly, thereby producing, through the instrumentality of the connecting rods 38 and the equalizer 39, rearwardly and simultaneous movement of the arms 37 of the levers 24 and forward movement of the arms 36 of the last named levers. In this operation it is apparent that the lever arms 34 by reason of their connections through the rods 35 with the arms 36, will be caused to move or turned forwardly on their pivots, thus causing the brake band to be clamped on the drum 25, for it will be understood that as the rods 46 each connect one of the brackets 44 to one of the levers on the brackets 32, the ends of the brake band 28 and its lining will be caused to approach each other and thus afford frictional pressure to the brake drums.

As the lever 40 and foot lever 51 are yieldingly connected together by means of the rod 49 and spring 55, it is manifest that yielding pressure will be afforded to the brake band 28 and that thus abrupt or too sudden stoppage of the front wheels will be obviated.

By my improvements it is manifest that the application of the brakes will be at three points; that is, one point within the transmission casing and another point on each of the front wheels of the automobile, and that by reason of the yielding pressure applied to the said wheels, compensation for the wear of the elements of the service brake mechanism within the transmission will be made.

A strap 56 extended across the upper portion of each of the spindle bodies 17 and secured at its ends to the dust plate 26 will assist the elements 18, 18ᵃ and 19 in securely holding said plate against rotary movement as is obvious.

Having thus fully described my invention, what I claim as new and desire to secure by Letters Patent is:—

The combination with a lever controlling the transmission brake of an automobile, of a bracket located upon the transmission case, an upright lever fulcrumed between its ends upon said bracket, an equalizing bar pivotally mounted on the lower portion of said upright lever, a connection united at one of its ends to each end of said bar on opposite sides of its pivot and operatively connected at its other end to a part to be operated thereby, a rod pivotally connected at one of its ends to the first named lever and adjustable yielding means at its other end cooperating with the upper portion of said upright lever for transmitting yielding force through said connections to the parts to be operated thereby.

EDWARD L. KULICK.